United States Patent
Dingle et al.

(10) Patent No.: US 7,077,083 B2
(45) Date of Patent: Jul. 18, 2006

(54) ELECTRO-HYDRAULIC LOST-MOTION VALVE TRAIN

(75) Inventors: Philip J. Dingle, Rochester, MI (US); Mark C. Sellnau, Bloomfield Hills, MI (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 10/997,464

(22) Filed: Nov. 24, 2004

(65) Prior Publication Data

US 2006/0107914 A1    May 25, 2006

(51) Int. Cl.
*F01L 9/02*  (2006.01)

(52) U.S. Cl. .............................. 123/90.12; 123/90.15; 123/90.13; 123/198 F; 251/129.19

(58) Field of Classification Search ............ 123/90.15, 123/90.16, 90.12, 90.13, 198 F
See application file for complete search history.

(56) References Cited

U.S. PATENT DOCUMENTS

| | | | |
|---|---|---|---|
| 4,716,863 A | * | 1/1988 | Pruzan .................... 123/90.15 |
| 5,934,643 A | | 8/1999 | Cooke |
| 6,227,154 B1 | | 5/2001 | Wakeman |
| 6,736,092 B1 | * | 5/2004 | Borean et al. ........... 123/90.12 |
| 2003/0221663 A1 | | 12/2003 | Vanderpoel et al. |

* cited by examiner

*Primary Examiner*—Thomas Denion
*Assistant Examiner*—Zelalem Eshete
(74) *Attorney, Agent, or Firm*—Jimmy L. Funke

(57) ABSTRACT

An electro-hydraulic lost motion system for variable valve activation including a master piston and an accumulation piston in a first bore, defining a hydraulic pressure chamber therebetween, in response to rotation of an engine cam. A slave piston in the engine head and hydraulically connected to the pressure chamber opens and closes an engine valve. A servo-valve behind the accumulation piston controls the mobility of the accumulation piston via a fluid control chamber. When the control chamber is made hydraulically rigid, the system actuates the engine valve. When the control chamber is vented through the servo-valve, the accumulation piston is movable in lost motion, preventing the engine valve from opening. All intermediate degrees of valve opening are possible. Preferably, the servo-valve, control chamber, accumulation piston, and a control piston are comprehended in a modular subassembly which may be positioned adjacent the master piston or the slave piston.

22 Claims, 8 Drawing Sheets

ELECTRO-HYDRAULIC LOST-MOTION VALVE TRAIN

TECHNICAL FIELD

The present invention relates to valve trains for internal combustion engines; more particularly, to a valve train having an electro-hydraulic link; and most particularly, to an electro-hydraulic valve train that includes a lost motion (LM) capability for variable valve activation.

BACKGROUND OF THE INVENTION

In prior art valve train mechanisms for internal combustion engines, either spark-ignited (SI) or compression-ignited (CI), mechanically operated poppet valves are typically employed, being actuated by a rotary cam and associated linkage known in the art as a valve train. Many arrangements of cam form, cam drive, and cam-to-valve linkage have been proposed and reduced to practice over the years. Some of the most popular have been codified in the art as Type-1, Type-2, etc. through Type-5.

One of the constraints common to prior art mechanically-actuated valve trains is that the spatial relationship between the cam and its associated valve or valves must observe well-defined geometric rules governing the kinematic behavior of the mechanism. One such constraint is that the cam follower must follow a path that is square to the cam surface (orthogonal of the cam axis of rotation) so that point loading at the interface is avoided. Similarly, a rocker that is in contact with a valve must describe an arc that falls in the same plane as the motion of the valve itself. If these basic mechanical rules are not observed, excessive noise and wear will result. Consequently, in the prior art the locations and motion paths of valves and camshafts are constrained within well-defined limits.

Several alternative mechanisms have been proposed that provide either cam-based lost-motion valve actuation, or in some cases, a cam-less mechanism. See, for example, U.S. Pat. No. 4,716,863 issued Jan. 5, 1988 to Pruzan; see also U.S. Pat. No. 6,227,154 B1 issued May 8, 2001 to Wakeman; see also U.S. Patent Application Publication No. U.S. 2003/0221663 A1, published Dec. 4, 2003, by Vanderpoel et al. With a cam-less mechanism certainly, and with specific embodiments of the lost-motion mechanism, spatial constraints of valve location relative to the camshaft no longer apply, thus permitting greater architectural freedom in design.

Given this freedom, there are several important benefits available to an engine design that is free of the constraints of a purely mechanical valve train:

1. Both SI and CI engines are known to benefit from provision of greater valve flow area and low port restriction, for both inlet valves and exhaust valves. These factors affect volumetric efficiency which in turn influences specific power and fuel consumption. To obtain these benefits, engine designs historically have evolved from two valves to four valves per cylinder, and in some cases to five valves per cylinder. Adding valves beyond four per cylinder is probably not cost-effective in a light-duty automotive engine, but a known way to obtain the benefits recited above with four valves is to move to radially-disposed valves wherein the valve axes are non-parallel to the cylinder axis and may or may not intersect at a point within the cylinder or engine head. This architecture allows larger valves to be specified for a given bore size, and permits straighter, less restrictive port designs. A very few prior art production engines have employed radial valves, a severe problem being the expensive and complex mechanism necessary to address the linkage issues. If such constraints are overcome, then the benefits of a radial valve layout are open to the engine designer. Thus, what is needed in the art is a simplified means for obviating the restraints of prior art mechanical valve trains.

2. A current trend in diesel engine combustion systems is a shift from conventional diffusion combustion toward a partially pre-mixed combustion mode in which a portion of the fuel charge is injected early during the compression stroke rather than late in the stroke near top dead center (TDC) as in the older prior art. When early injection is attempted with conventional nozzles optimized for late injection and having an included spray angle of about 150°, there is a high probability of fuel's impinging undesirably on the cylinder walls, leading to premature engine wear. This, in turn, is driving a further trend toward narrower angle spray patterns in an attempt to obtain a long free-plume length before surface impingement. This objective is enhanced by radially-disposed valves, since the injector in a domed firing chamber may be withdrawn further away from the piston. Thus a better match between combustion system and chamber geometry is possible if an enabling technology were available. Again, what is needed in the art is a non-complex means for obviating the restraints of prior art mechanical valve trains to allow radial valving in a domed firing chamber.

3. Inlet-generated swirl of air and fuel is an important combustion control parameter for most diesel engines and some SI engines. The normal prior art method to generate such in-cylinder swirl motion is through the use of one or more "directed" ports wherein the flow direction is generally tangent to the cylinder wall, so that momentum built up in the intake tract is sustained and translated into rotational swirl in the cylinder. This technique may require a relatively long intake tract in the cylinder head in which to develop the necessary momentum, and this in turn can drive the need for a skewed valve layout in the cylinder head ("skewed" as used herein should be taken to mean a layout wherein the valve pairs do not lie in a line parallel to or orthogonal to the axis of the cylinder bank). Such a layout is problematic for a conventional mechanical valve train since the distance from the camshaft to each valve stem is different, resulting in complex linkage solutions or compromised port design. Again, swirl is fundamental to efficient diesel combustion, so the ability to optimize the inlet port for swirl rather than for valve train considerations would provide a competitive advantage. What is needed in the art is a means for removing valve train considerations as port design constraints.

Given these incentives to escape from the constraints of mechanical linkages, several electromechanical and electro-hydraulic concepts have been proposed in publications in the engine arts, but none has been accepted or commercialized to date due to excessive cost, complexity, and durability concerns.

A separate but related interest in the engine arts is variable valve activation (VVA) of engine valves, especially intake valves, also known interchangeably in the art as variable valve deactivation. To selectively shut off one or more engine valves to improve fuel efficiency in low load conditions, various design approaches to partial or total deactivation are well known. In each such design approach, a valve-deactivation strategy is incorporated wherein the rotary motion of an engine cam continues unabated but the lift motion is lost in the translation between the cam and its associated valve(s) by a mechanical decoupling of the valve train. In the prior art, mechanical accommodation is provided for the lost motion via, for example, a variably-latchable rocker arm assembly or a variably-latchable hydraulic valve lifter assembly.

Various electro-hydraulic systems also have been proposed in the prior art, wherein a primary piston actuated by hydraulic linkage to a cam drives a valve stem, and a lost-motion chamber for accumulating hydraulic fluid may be selectively accessed via a high-speed solenoid valve. See, for example, U.S. Pat. No. 6,227,154 wherein a solenoid-actuated three-port spool valve selects between a valve-actuating piston and a lost-motion piston. A general shortcoming of such systems is the flow restriction imposed by the solenoid valve itself, limiting the speed of response of the system and creating high pumping losses. Further, such designs are not readily applicable to non-overhead cam engines. Further, such prior art designs use engine oil as the hydraulic medium, which oil becomes dirty and degraded with carbon deposits during prolonged use, resulting in wear, clogging, and variable performance of the LM system.

An alternative approach is known in the prior art and is exemplarily disclosed in U.S. Pat. No. 4,716,863, wherein a slave piston actuated by hydraulic linkage to a master piston and cam drives an intake valve stem, and a solenoid controls the position of a secondary accumulation piston in a sidearm and "thus expansion of the hydraulic line volume, thereby controlling the opening and closing, timing, and displacement of the intake valve." Access to the pressure chamber formed in the sidearm does not require passage of hydraulic fluid through a valve. A serious shortcoming of this configuration is that a relatively large, powerful, and expensive solenoid is required to manage precise positioning of the accumulation piston against the entire force brought to bear on the face of the piston; such a solenoid typically lacks the desired high rate of response. The above-recited shortcomings resulting from use of engine oil as the hydraulic medium also pertain.

A further related interest in the engine arts is variation in the timing of opening and closing, and of the amplitude of opening, for both intake valves and exhaust valves for a variety of engine operational modes. This interest extends to both SI and CI engines. When combined with LM capability, the resulting flexibility in valve operation can have very large effects in a wide variety of vehicle and engine parameters, including at least fuel efficiency, ease of starting, low-end torque and turbocharged transient behavior, pollution abatement, vehicle braking; and engine wear, complexity, cost of manufacture, and ease of repair. Comparable improvements in these categories cannot be readily achieved in any way other than VVA/LM.

What is needed in the art is means for efficiently and economically combining variable valve actuation and lost-motion capability in an electro-hydraulic valve train.

It is a principal object of the present invention to provide improvements in fuel efficiency, ease of starting, low-end torque and turbocharged transient behavior, pollution abatement, vehicle braking; and engine wear, complexity, cost of manufacture, and ease of repair in an internal combustion engine.

It is a further object of the present invention to provide such improvements in a compression-ignited engine, whether operating on the Diesel cycle or alternative cycles such as Homogeneous Charge Compression Ignition (HCCI), whether in two-, four-, six- or eight-stroke combustion cycles as are known in the prior art.

SUMMARY OF THE INVENTION

Briefly described, an electro-hydraulic lost motion system for variable valve activation in accordance with the invention includes a master piston freely slidable in a first bore in an internal combustion engine in response to rotation of an engine cam associated with an engine valve, either intake or exhaust.

The first bore is remote from the valve to be variably controlled and also contains a slidable accumulation piston defining a movable pressure chamber between the master piston and the accumulation piston. The pressure chamber is supplied with hydraulic fluid as may be needed via a port in the first bore.

A slave piston operative in a slave piston housing adjacent the engine valve is hydraulically connected to the pressure chamber via a passageway such that, in valve activation mode of the system, rotation of the cam causes the slave piston to open and close the valve.

The outer end of the first bore is closed by a housing including a second bore open toward the accumulation piston and defining a small hydraulic control chamber. A solenoid-actuated servo-valve connects the control chamber to a hydraulic sump.

The accumulation piston is provided with a hollow rod extending slidably into the second bore. An opening in the accumulation piston provides hydraulic communication between the pressure chamber and the control chamber through the hollow rod, and the hollow rod defines a control piston for varying the volume of the control chamber in accordance with position of the accumulation piston in the first bore. A check valve in the control piston prevents egress of hydraulic fluid into the pressure chamber during LM displacement of the accumulation piston.

During valve-activation mode, the servo-valve is kept closed, the volume of the control chamber is thus fixed, and accordingly the accumulation piston cannot retract. Consequently, motion of the master piston causes the slave piston to be actuated, opening the engine valve.

During valve-deactivation mode, the servo-valve is opened during the master piston stroke, the control piston is thus free to slide further into the second bore decreasing the volume of the control chamber by displacing hydraulic fluid through the servo-valve to the sump, and the accumulation piston is displaced in lost motion instead of the slave piston. At the end of the accumulation piston stroke, the servo-valve is closed as a check valve against aspiration of air into the control chamber from the sump. A return spring behind the accumulation piston urges the accumulation piston, and hence the master piston, in a return stroke as the cam lobe moves into the retraction phase. A suction is drawn in the control chamber, causing the chamber to refill with hydraulic fluid from the pressure chamber in readiness for the next lost-motion stroke.

A lost motion system in accordance with the invention is readily adaptable to either SI or CI engines but is especially suited to diesel-type engines wherein the hydraulic fluid is preferably diesel fuel supplied by the fuel injection system rail supply pump, and especially V-style engines wherein a single camshaft in the V can actuate all intake and exhaust valves. Additionally, when a cam phaser device is incorporated in the camshaft drive, the timing of valve opening, closing, valve lift, and intake/exhaust crossover, can be highly controlled by the judicious manipulation of the two mechanisms to optimize engine operation over a variety of operating modes.

A particular benefit of an electro-hydraulic valve train in accordance with the invention is that the location of the camshaft during the base engine architectural design phase may be determined by the convenience of the drive arrangement, rather than, as in the prior art, by the location of the valves.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
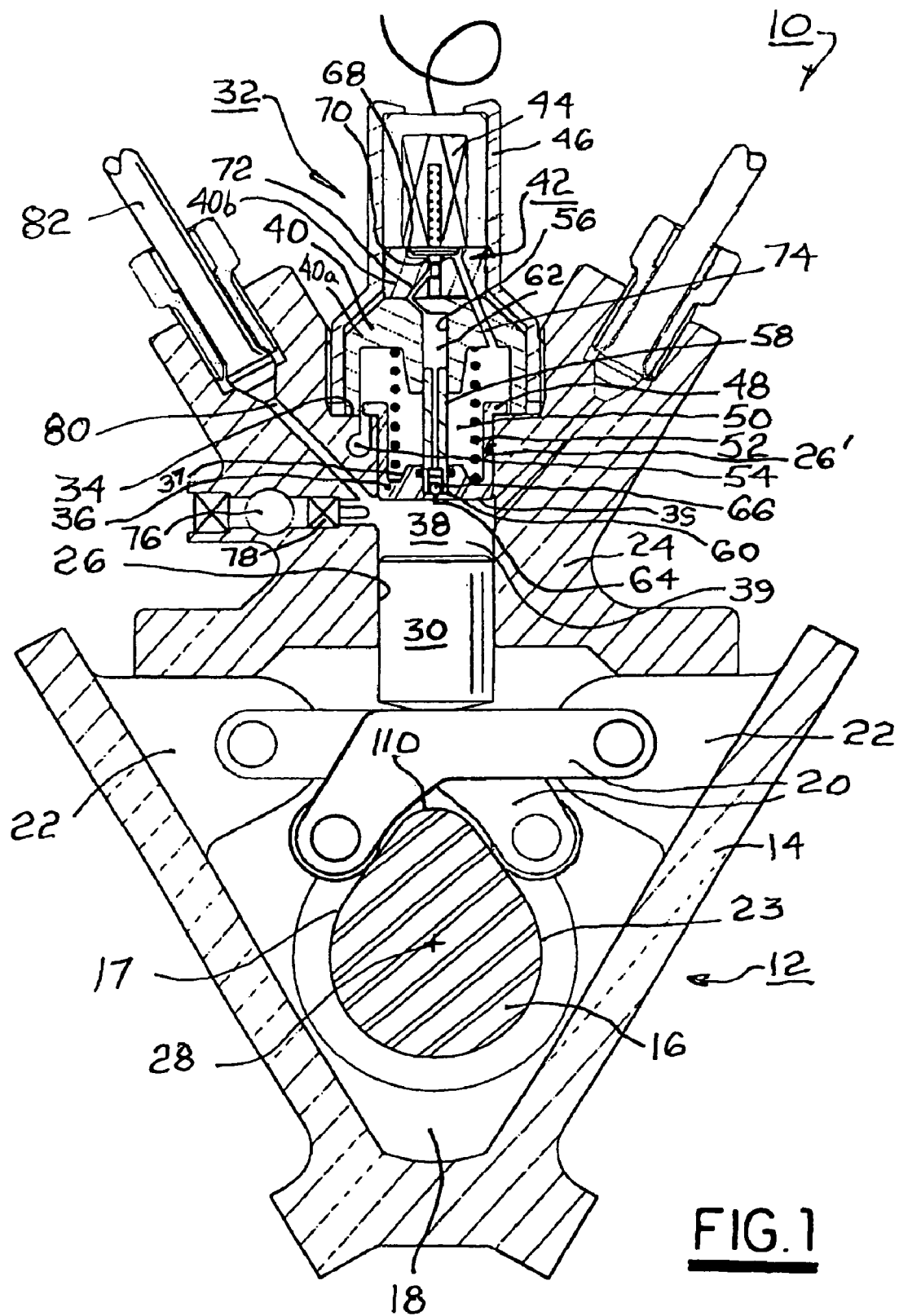
FIG. 1 is an elevational cross-sectional view of a portion of a V-style internal combustion engine in accordance with the invention, showing a novel lost-motion system and subassembly in the valve train.
Figure 2:
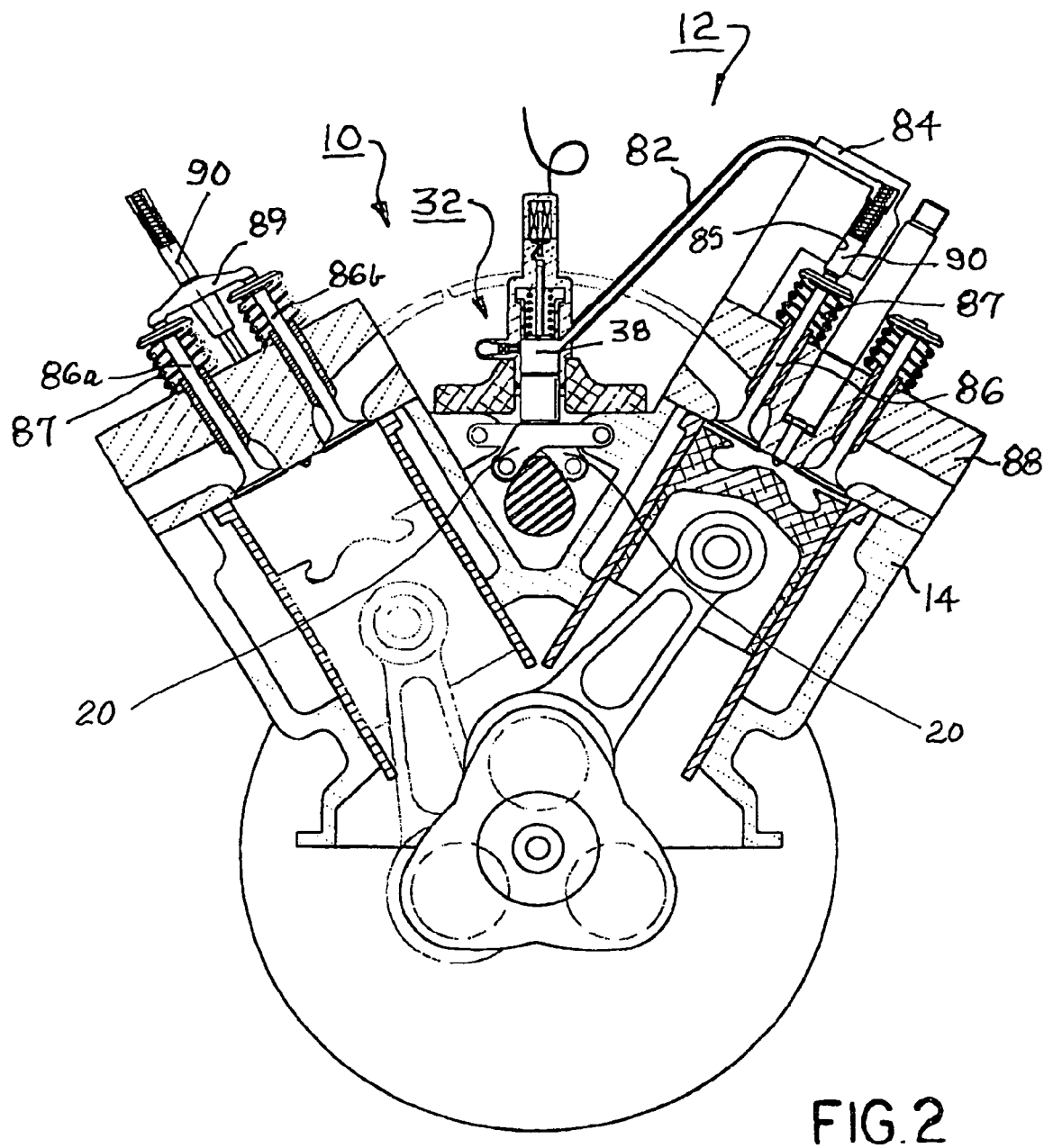
FIG. 2 is an elevational cross-sectional view of a V-style compression-ignited internal combustion engine incorporating the lost-motion system shown in FIG. 1, and showing exemplary single- and paired-valve actuations.

Referring to FIGS. 1 and 2, a novel electro-hydraulic lost-motion valve control system 10 in accordance with the invention is shown for use as a component of an internal combustion engine 12. Engine 12 as shown has a V-style engine block 14 (for example, a V-6 engine) having a single camshaft 16 (for example, as shown for a V-6 engine in FIG. 3) disposed centrally in a V-shaped well 18 within engine block 14, although the invention may be readily adapted to other engine layouts. Roller finger followers 20 are pivotably mounted to mounting flanges 22 extending into well 18 from engine block 14 for following the surfaces 23 of individual cam lobes 17 of camshaft 16.

The combustion cycle of engine 12 may be two-stroke, four-stroke, six-stroke, or eight-stroke as is known in the prior art.

Lost-motion valve control assembly 10 comprises a body 24 mounted on flanges 22. Preferably, body 24 is modular and contains a plurality of assemblies 10 disposed along the length of engine 12 and camshaft 16, one per valve train for each intake and exhaust valve. Body 24 includes a main bore 26 orthogonal to the axis 28 of camshaft 16 for slidably receiving a free master piston 30 that rides on a finger follower 20 and is freely displaceable thereby in main bore 26 in response to rotation of camshaft 16. In a currently-preferred embodiment, the finger followers 20 for the intake valves and the exhaust valves of an individual cylinder may be driven by a single cam lobe, the followers being so arranged that they contact the cam lobe at the appropriate phase relationship and thereby impart the cam motion with the correct valve event timing to the LM master piston 30.

Figure 7:
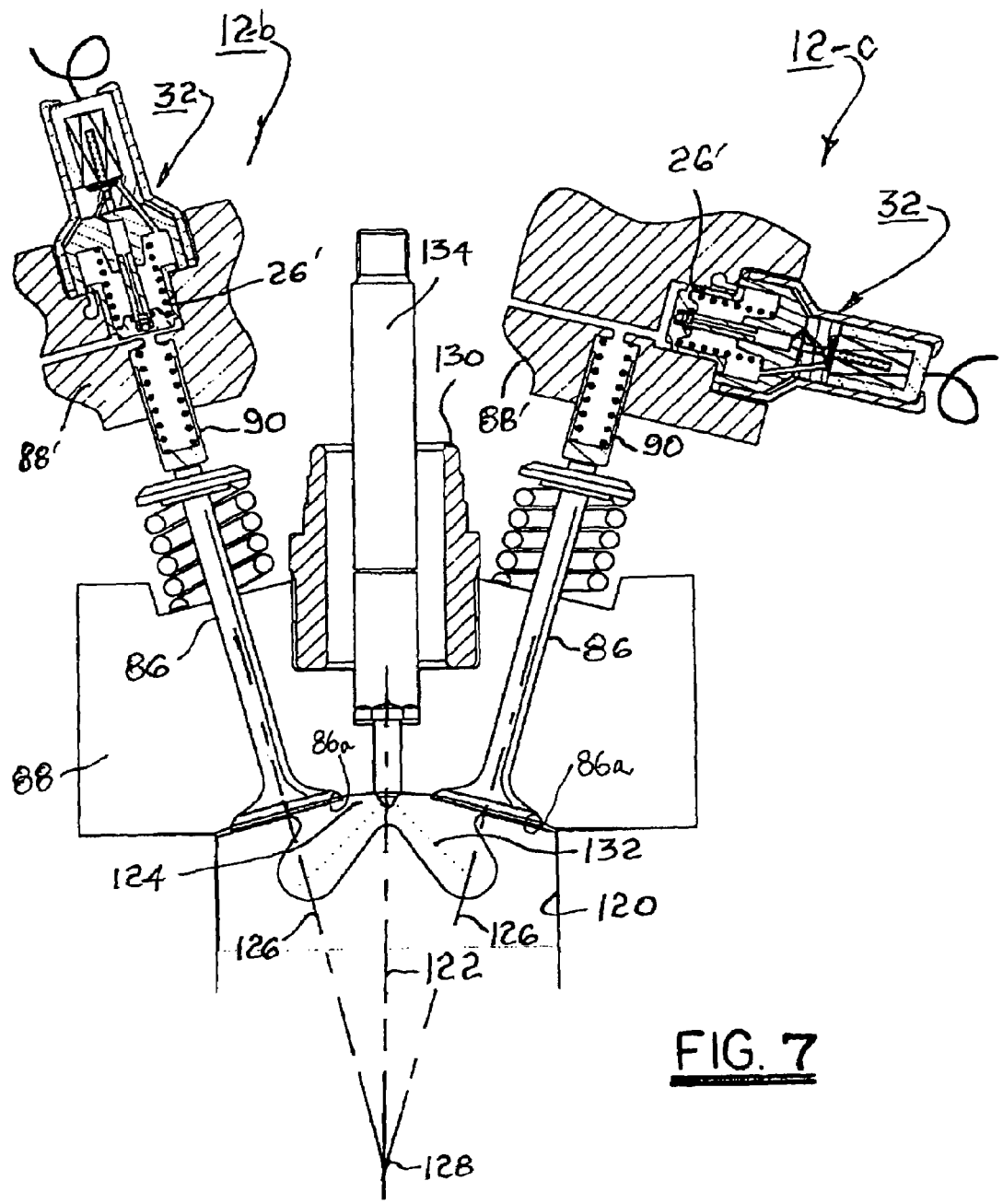
FIG. 7 is an elevational cross-sectional view of a compression-ignited cylinder having a domed firing chamber, showing first and second alternative embodiments of a lost motion system including the lost motion subassembly shown in FIGS. 1 and 2 located at the engine valve rather than at the camshaft.

A lost-motion servo-controlled module 32 is disposed in a shoulder 34 at the outer end of an LM bore 26' and includes an accumulation piston 36 extending into LM bore 26' and cooperating with master piston 30 to define, in conjunction with a first side 35 of piston 36, a pressure chamber 38 therebetween, having a lost motion volume 39. In the example shown in FIGS. 1 and 2, LM bore 26' is proximate to and coaxial with main bore 26; however, as is shown in FIG. 7, within the scope of the invention, LM bore 26' may be remote from main bore 26 and may be formed, for example, in the engine head 88' rather than in body 24.

Module 32 includes a valve body 40 for a servo-valve 42 linearly actuated by a solenoid 44. A shell 46 surrounds valve body 40 and solenoid 44. Accumulation piston 36 includes a flange 48 for engaging shoulder 34 to limit travel of piston 36 away from solenoid 44. A well 50 provides for and limits travel of piston 36 in the opposite direction. A return spring 52 urges piston 36 away from valve body 40. Well 50 is in communication with a hydraulic sump (not shown) via a gutter 54 in assembly body 24 preferably extending the length of assembly body 24. Preferably, well 50 is also modular and extends the length of module valve body 40 such that a linear plurality of modules 32 are in communication, thereby relieving pressure imbalances among the plurality of wells 50 as the individual accumulation pistons are displaced, as described below.

Valve body 40 includes an axial bore 56 open toward piston 36. A hollow control piston 58 is fixedly received in a socket 60 formed in a second side 37 of piston 36 and extends partially into bore 56 to define a control chamber 62, the volume of which thus changes in direct relation to the position of accumulator piston 36 within LM bore 26'. A passage 64 through piston 36 allows hydraulic communication between pressure chamber 38 and control chamber 62 via control piston 58. A check valve 66 prevents backflow of hydraulic fluid from control chamber 62 into pressure chamber 38.

Valve body 40 comprises a first body element 40a and a second body element 40b and includes a valve chamber 68 having a conventional seat 70, a first passage 72 between control chamber 62 and valve chamber 68, and a second passage 74 between chamber 68 and well 50, the two separate body elements facilitating machining of the passages. Servo-valve 42 regulates flow through passages 72,74.

A hydraulic fluid supply gallery 76 runs the length of assembly body 24 and communicates with pressure chamber 38 via a check valve 78.

An actuation passage 80 in body 24 extends from pressure chamber 38 to a hydraulic line 82 which leads to a slave cylinder block 84 adjacent an engine valve 86 in engine head 88 to be controlled by electro-hydraulic lost-motion valve control assembly 10. A slave piston 90 disposed in slave bore 85 in block 84 actuates valve 86 in response to hydraulic pressure from pressure chamber 38. Of course, the actuated valve may be a pair of valves 86a,86b connected conventionally by a bridge structure 88, as is known in the prior art. FIG. 1 shows actuation passages extending from both sides of chamber 38 and body 24; this is intended to show that outlets on both sides of the housing are possible, although normally only one such conduit per chamber should be expected.

Figure 3:
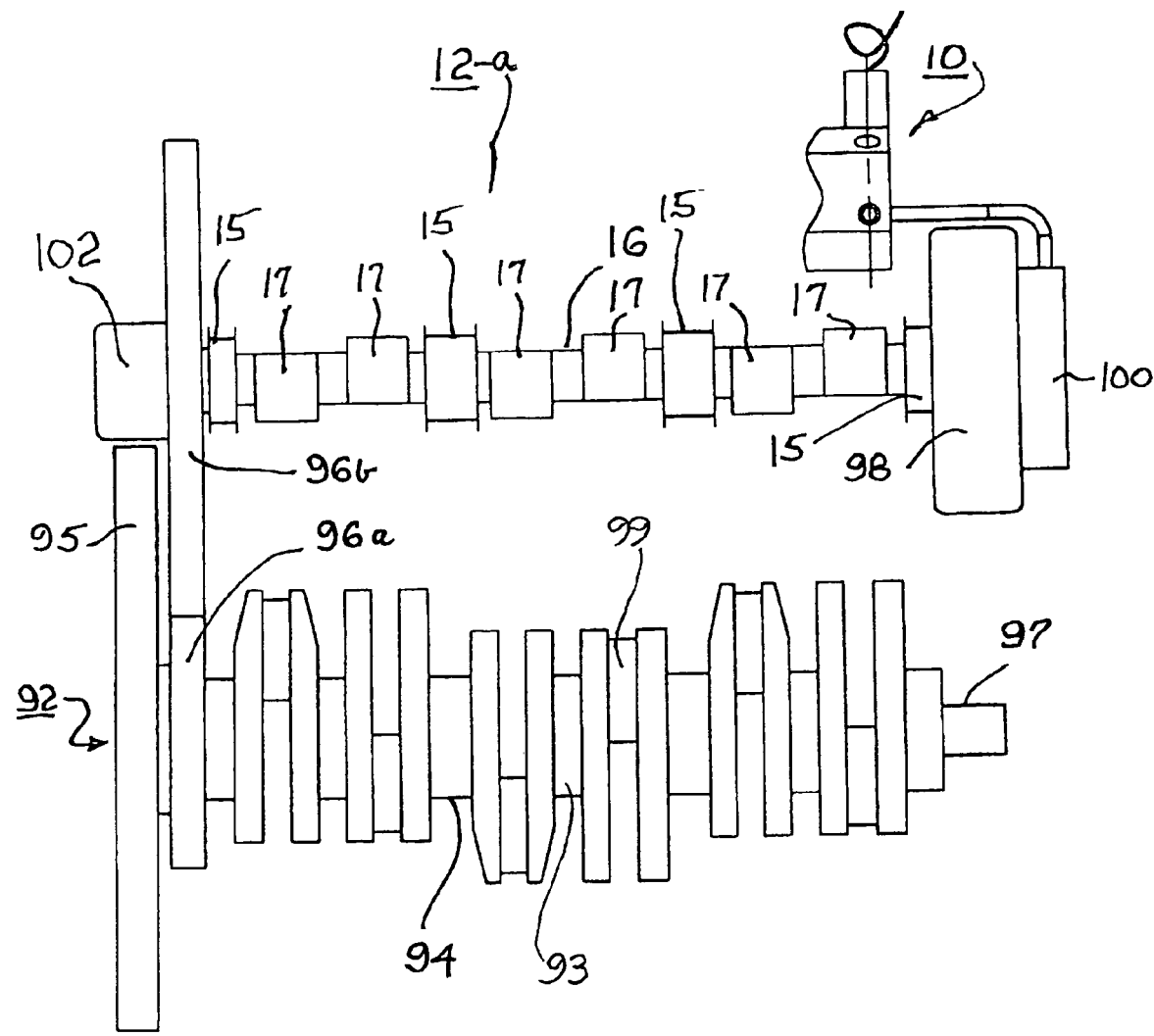
FIG. 3 is a schematic cross-sectional elevational view of the engine shown in FIG. 2, showing the driving relationship between the crankshaft, the camshaft, a camshaft phaser, the fuel pumping system, and a lost-motion valve system.

Referring now to FIG. 3, in a currently preferred embodiment of an electro-hydraulic lost-motion valve control assembly 10 for use in a CI engine such as a diesel engine 12-*a*, the hydraulic fluid is diesel fuel supplied from the engine fuel supply system. In a preferred engine layout, camshaft 16 is driven from the flywheel end 92 of crankshaft 94 as by gears 96a,96b, timing belts (not shown), or timing chains (not shown) as is known in the prior art. This location for the camshaft drive elements, adjacent the flywheel 95 and at substantially a nodal point of crankshaft torsional flexure, provides for improved camshaft rotational uniformity over the uniformity resulting from prior art camshaft drives from the non-flywheel, "free" end 97 of the crankshaft. Thus, a more stable and precise valve timing may be obtained.

A high-pressure fuel pump 98 for dispensing diesel fuel to the fuel rail or rails of the engine is conveniently disposed on the free end of camshaft 16. An additional transfer pump 100 disposed on fuel pump 98 supplies diesel fuel to the previously-described gallery 76 in body 24.

Driving the fuel pump from the free end of the camshaft also makes possible a significant reduction of undesirable pumping pulses experienced at the engine fuel injectors (as occurs in prior art fuel pump systems wherein the fuel pump is driven from the crankshaft, the camshaft, or by an electric motor and typically includes a flywheel to damp out pulses) by adjusting the angular relationship of the pump to the camshaft such that the negative and positive pump pulses are in cancelling phase with the camshaft rotational pulses resulting from engine valve events, thereby smoothing the pump output.

Referring again to FIG. 3, a conventional camshaft phaser 102 may be interposed between camshaft drive gear 96b and camshaft 16 so that the phase relationship between the crankshaft and the camshaft may be altered as may be found beneficial. Cam profiles may then be dimensioned for a near-normal lift duration; otherwise, greatly extended duration profiles are necessary to accommodate a full range of desired valve event timings, and normal durations would have to be provided by invoking the lost-motion facility. It is not known in the prior art to combine lost-motion capability with camshaft phasing capability. In the present invention, the combination is made relatively simple by providing the phaser at the flywheel-driven end of the camshaft and disposing the fuel pumping apparatus on the opposite, free end 97 of the camshaft.

It will be seen that a potential danger is created in providing camshaft phasing together with a valve lost-motion system 10 in an interference engine such as a diesel engine, because failure of control of the lost-motion system can result in destructive collision of the valves with the pistons. However, such combination can provide a hitherto impossible range of valve timing and valve lift, resulting in greatly improved operation and fuel efficiency over a wide range of engine and vehicle operating conditions.

Figure 5:
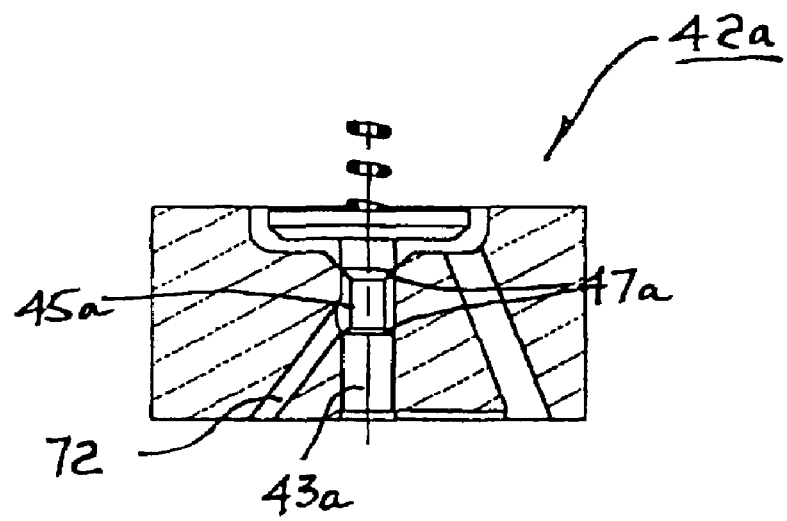
FIG. 5 is an enlarged cross-sectional view of a first embodiment of a servo-valve, normally-closed, as may be used in the lost motion system shown in FIGS. 1 and 2.
Figure 6:
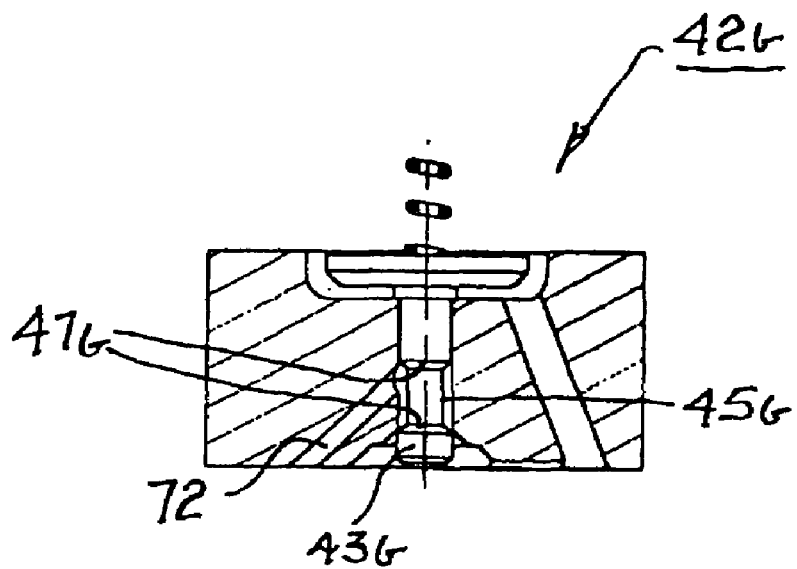
FIG. 6 is an enlarged cross-sectional view of a second embodiment of a servo-valve, normally-open, as may be used in the lost motion system shown in FIGS. 1 and 2.

Referring to FIGS. 5 and 6, it is seen that servo-valve 42 may be configured as normally closed (42a) (FIGS. 1 and 2) or normally open (42b). In either case, the shaft 43a,43b is provided with a reduced-diameter portion 45a,45b having bevels 47a,47b of approximately equal areas such that the valve is urged by fluid in passage 72 with equal force in the open and closed directions and is thus force-balanced, requiring a relatively small and agile solenoid 44 for actuation in either direction. When servo-valve 42a is used, failure of the solenoid simply disables the lost-motion capability, and a vehicle with such an engine could still be driven to a repair shop ("limp-home" mode). However, if an oversized cam is also being employed, failure of an LM system employing servo-valve 42a can result in piston/valve interference, as noted above. For servo-valve 42b, solenoid failure leaves the engine in LM mode with the respective valves unopenable, and such a vehicle would therefore be undriveable if all such valves were affected (no "limp-home" mode). However, failure of servo-valve 42b does not jeopardize the engine for piston/valve collision.

Figure 4:
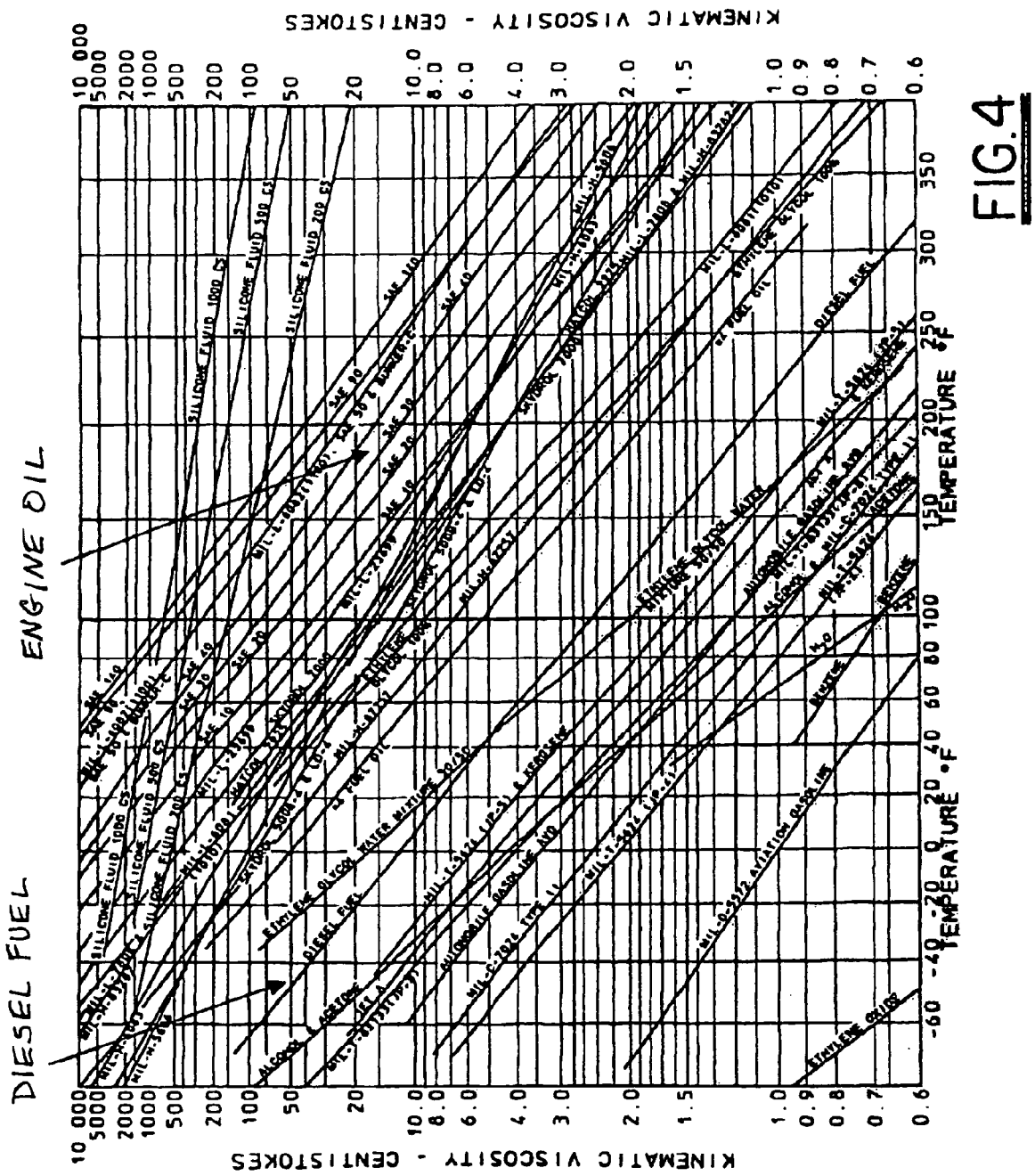
FIG. 4 is a graph of fluid viscosity as a function of temperature, comparing the rheological characteristics of diesel fuel and SAE 30 engine oil as a hydraulic fluid.

The use of diesel fuel as the hydraulic fluid for a lost-motion system in accordance with the invention is a significant improvement in the engine arts. In prior art LM systems, the hydraulic fluid typically is engine oil provided from the engine crankcase. With use as an engine lubricant, engine oil becomes loaded with carbon from exhaust blow-by which causes wear of mechanical parts and clogging of passages. Diesel fuel is highly filtered before entering an engine fuel distribution system and is not subject to long-term reuse as is engine oil. Thus diesel passages can remain clean and free of build-up during engine use. Referring to FIG. 4, it is seen that diesel fuel is substantially less viscous than, for example, SAE 30 engine oil, by at least an order of magnitude. This is a critical difference, as in any electro-hydraulic LM system, some hydraulic fluid must flow through an electrically-controlled mechanical valve. Low viscosity of the fluid is important to a low-hysteresis, rapid-response system. Further, diesel fuel has a thermal viscosity coefficient (slopes of the respective curves in FIG. 4) at least comparable to that of engine oil.

It should be noted that a potentially negative aspect of an electro-hydraulic lost-motion valve train is that the fluid volume per valve line through which the valve actuating force is transmitted is large, and the stiffness of the system is not as great as prior art fully-mechanical mechanisms. Therefore, efforts should be made to minimize the internal fluid volumes without restricting flow areas, for example, through use of techniques that are common in the prior art of diesel fuel injection such as using volume reducers in spring chambers (not shown). Simple calculations suggest that for an exemplary embodiment in which the engine valve opening load is 900 N, the slave piston diameter is 12 mm, and the system dead volume is 4880 mm$^3$, the loss of lift from fuel compressibility alone will be about 0.24 mm, or about 2% of nominal.

In the present invention, diesel fuel is the preferred lubricant for all the camshaft bearings 15, slave pistons 90, master pistons 30, lost-motion accumulation pistons 36, and servo-valves 42 for electro-hydraulic lost-motion valve control assemblies 10. As in the prior art, crankcase oil can be used to lubricate lower crankcase components such as, for example, crankshaft bearings 93, connecting rod bearings 99, and wrist pins (not shown).

In operation, referring to FIGS. 1 and 2, electro-hydraulic lost-motion valve control assembly 10 operates as follows.

At a starting position, cam followers 20 are on a base circle portion of camshaft lobe 17. Gallery 76 is filled with diesel fuel under pressure, for example, about 7 bar. Pressure chamber 38, control chamber 62, and passage 80 and line 82 are filled with hydraulic fluid (diesel fuel). Servo-valve 42 is closed, making control chamber 62 and its associated passages hydraulically rigid. Engine valve 86 is closed.

When the engine is in normal, conventional operating mode, as cam 16 rotates eccentric 110 past finger follower 20, master piston 30 is moved toward accumulation piston 36, which cannot move because servo-valve 42 is closed. Thus, pressure chamber 38 is compressed and hydraulic fluid is forced through line 82, causing slave piston 90 to open engine valve 86. When eccentric 110 passes TDC on follower 20, master piston 30 follows follower 20 as it returns to the base circle portion of camshaft lobe 17 in response to force from the engine valve closing spring 87.

When the engine is in LM operating mode, servo-valve 42 is initially open. As cam 16 rotates eccentric 110 past finger follower 20, master piston 30 is moved toward accumulation piston 36. Because control chamber 62 is hydraulically open to well 50 through servo-valve 42, and because engine valve spring 87 is stronger than return spring 52, accumulation piston 36 moves instead of slave piston 90, displacing hydraulic fluid from control chamber 62 into well 50 from whence the fluid drains via gutter 54. Accumulation piston 36 moves in LM bore 26' in tandem with master piston 30 in main bore 26, thus maintaining substantially constant the volume of pressure chamber 38. At the top of the stroke of the two pistons, servo-valve 42 is closed. When eccentric 110 passes TDC on follower 20, master piston 30, accompanied by pressure chamber 38 and accumulation piston 36 follows follower 20 as it returns to the base circle portion of camshaft lobe 17 in response to force from return spring 52. As this occurs, a vacuum is created in control chamber 62, and hydraulic fluid from pressure chamber 38 is drawn in via passage 64 and check valve 66, and an equivalent amount is replenished to pressure chamber 38 from gallery 76 via check valve 78. At the end of the return stroke, servo-valve 42 is reopened in preparation for the next lost-motion requirement.

The above operating description explains the sequence of events where the required engine valve motion is as fully described by the cam profile. However, a well-known advantage of lost-motion systems is that late opening (and by definition centered reduced lift and duration valve events) or early closing or altogether skipped valve events are possible. To achieve this functionality, a mechanism having rapid response is necessary, and the apparatus disclosed herein has unique advantages with respect to the prior art. The following are some possible modified valve events.

For a skipped valve event (normal LM mode), servo-control valve 42 remains off its seat through the positive lift portion of the event so that the master piston displacement translates into a matching displacement of accumulation piston 36. In turn, hollow control piston 58 displaces fluid from control chamber 62 through the servo-valve to drain via gutter 54. The control piston is sized to minimize wasted fluid, and a small piston diameter permits a small control valve with minimal energy requirements, a significant improvement over the prior art. Retraction of control piston 58 allows a return of accumulation piston 36 and a subsequent recharging of control chamber 62. This capability is essential to achieve cylinder disablement, and also for event disablement as where, for example, additional cam bumps (not shown) are provided for engine compression braking or for 2- or 6-stroke operation, which are known in the art to be enablers for some advanced combustion cycles.

For an early closing valve event, either intake valve or exhaust valve, the sequence of events is as described above; but at the crank angle when it is desired for the engine valve to close, the servo-control valve opens, allowing the accumulation piston to retract and thus permitting the engine valve to seat. As the master piston continues to retract after the engine valve has seated, the servo-control valve closes, allowing the accumulation piston to return with the master piston, thus minimizing wasted fluid.

For a delayed valve opening event, either intake valve or exhaust valve, the servo-control valve remains open until the appropriate time, at which point it closes, arresting the LM displacement of the accumulation piston. At that point, continued travel of the master piston causes corresponding displacement of the slave piston. A potential weakness of all LM strategies is that the point at which engine valve motion is required and the control valve is to be closed may coincide with a high acceleration portion of the cam profile. This can lead to a high "jerk" motion to the valvetrain system and hence to high stress and instability. To offset this, multiple pulsing of the servo-control valve may be invoked by an algorithm that relates control valve pulses to the system natural frequency so that the undesirable motions are cancelled out, which strategy is analogous to similar strategies in the diesel prior art with this control valve when used for fuel injection. Again, to minimize fluid loss, the servo-valve reopens for the final portion of the master piston return stroke as described above.

The capability of rapid, multiple actuations of the servo-valve can be extremely useful during a portion of a valve event, such as engine valve closing. In the prior art, it is known to provide a hydraulic snubber for each valve to soften the closing impact. Such snubbers are well-known in art for being vulnerable to a variety of problems, such as oil viscosity variation, leading to variation in snubbing effectiveness, and valve seat recession and/or valve expansion lengthwise affecting duration of snubbing action. For an engine equipped in accordance with the present invention, snubbers may be omitted, at a considerable cost savings. When full duration valve lift is required, appropriate valve seating velocity is enabled by the cam profile, but when early valve closing is required, the servo-valve may be multiply pulsed during the closing stroke to soften the closing impact of the engine valve.

A first significant advantage of the layout shown in FIGS. 1 and 2, and of the invention, is that a single camshaft can replace the four dual overhead camshafts that would typically be used in such an engine in the prior art.

A second advantage is that, by appropriate layout of the camshaft 16, roller finger followers 20, and engine flanges 22, both the intake and exhaust valves for each engine cylinder may be actuated by a single camshaft lobe 17 (see FIG. 3), thus simplifying the design and manufacture of a camshaft.

A third advantage is that the entire upper end of the engine is lubricated by a high-quality, low-viscosity, non-carbonizing hydraulic fluid separate from the engine crankcase oil.

A fourth advantage is that the preferred system takes advantage of known technology in a number of critical areas. For example, the servo-valve 42 is substantially identical with a fuel injection valve currently in production and having a long history of reliability. See U.S. Pat. No. 5,934,643 issued Aug. 10, 1999 to Cooke. For another example, the close piston-to-bore clearances necessary for acceptable leakage with diesel fuel are a core competency in the art of fuel-injected engines; and relaxed tolerances are possible if the additional complication of elastomeric seals such as O-rings are incorporated.

A fifth advantage is that the positioning and movement of the accumulator piston is governed by a force-balanced servo-valve which permits displacement of a relatively small amount of hydraulic fluid from or to the control chamber to accommodate lost motion of the accumulator piston, as opposed to various prior art systems wherein either all the displaced hydraulic fluid must pass through the control valve (e.g., U.S. Pat. No. 6,227,154 B1; U.S. Patent Application Publication 2003/0221663 A1) or the entire force of the pressure chamber on the accumulation piston must be resisted by a solenoid (e.g., U.S. Pat. No. 4,716,863).

Referring to FIG. 7, in second and third alternative engine configurations 12-b, 12-c, respectively, in accordance with the invention, lost-motion servo-controlled module 32 may be placed in an LM bore 26' formed in the engine head 88', which bore defines a sidearm in communication with slave piston 90. Bore 26' may be formed co-linear with piston 90 (configuration 12-b) or orthogonal thereto (configuration 12-c), or at any other angle thereto as may be desired. The camshaft, roller follower, and master piston arrangement from FIGS. 1 and 2 remain unchanged, but lost-motion volume changes now occur in the head rather than in the engine V. In some applications, locating module 32 in the engine head adjacent the valve being controlled can be advantageous for speed of valve response. However, line pressure losses between the master piston and the accumulation piston must be taken into account.

Figure 8:
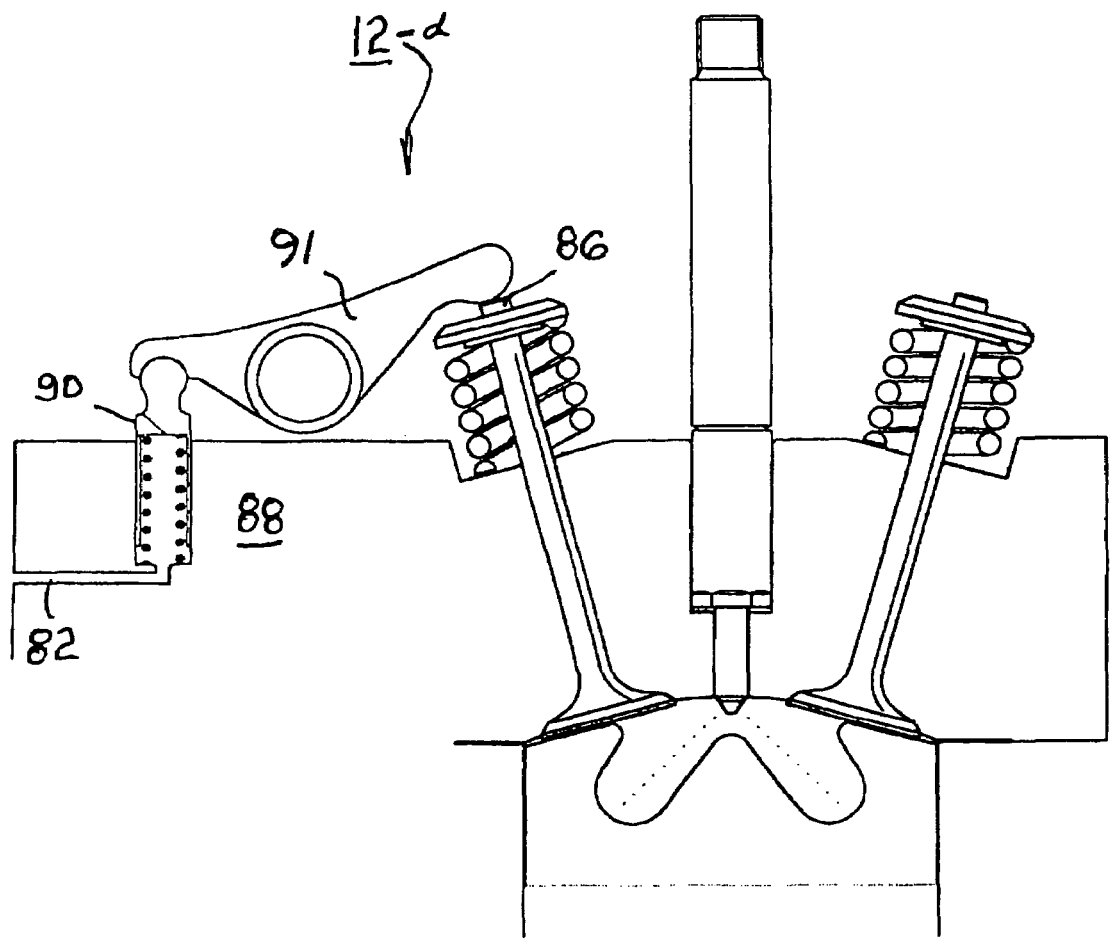
FIG. 8 is an elevational cross-sectional view of a compression-ignited cylinder having a domed firing chamber, showing another embodiment of a lost motion system in accordance with the invention.

Referring to FIG. 8, a fourth configuration 12-d is similar to first configuration wherein slave piston 90 is disposed in a slave bore in head 88, except that the motion of slave piston 90 is transmitted to valve 86 via a rocker arm 91.

Referring to FIGS. 7 and 8, an important engine design freedom conferred by an electro-hydraulic valve train system in accordance with the invention is that the engine valves 86 and their respective seats 86a may be readily oriented at any desired angle with respect to the engine cylinder 120 and cylinder axis 122. Further, the firing chamber 124 in head 88, 88' need not be flat as in the prior art. An especially desirable shape for firing chamber 124 is domed, as shown in FIG. 7, wherein the valve axes 126 may be oriented non-parallel to cylinder axis 122 and preferably radially of a point 128 on cylinder axis 122. If desired further, the valves may be positioned at a compound angle (not shown) such that the valve axes do not intersect either each other or the cylinder axis. The dome shape may be spherical or not.

Radial valves offer larger port areas, better breathing, improved injector cooling, and are synergistic to a "narrow angle" diesel combustion chamber which is known in the recent diesel development literature to be favored for advanced "pre-mixed" fuel injection systems. A domed firing chamber provides a longer length of "free plume" spray 132 from a fuel injector 134.

Disposing the valve axes at an angle to the cylinder axis also creates valuable room above the firing chamber, permitting installation of a highly-desirable cylinder pressure sensor 130. Such a sensor, by providing a real-time signal of when a valve is open and closed, can permit timing of the multiple control pulses during valve closing, as described above, to achieve consistent valve seating under any condition of engine operation or wear.

Figure 9:
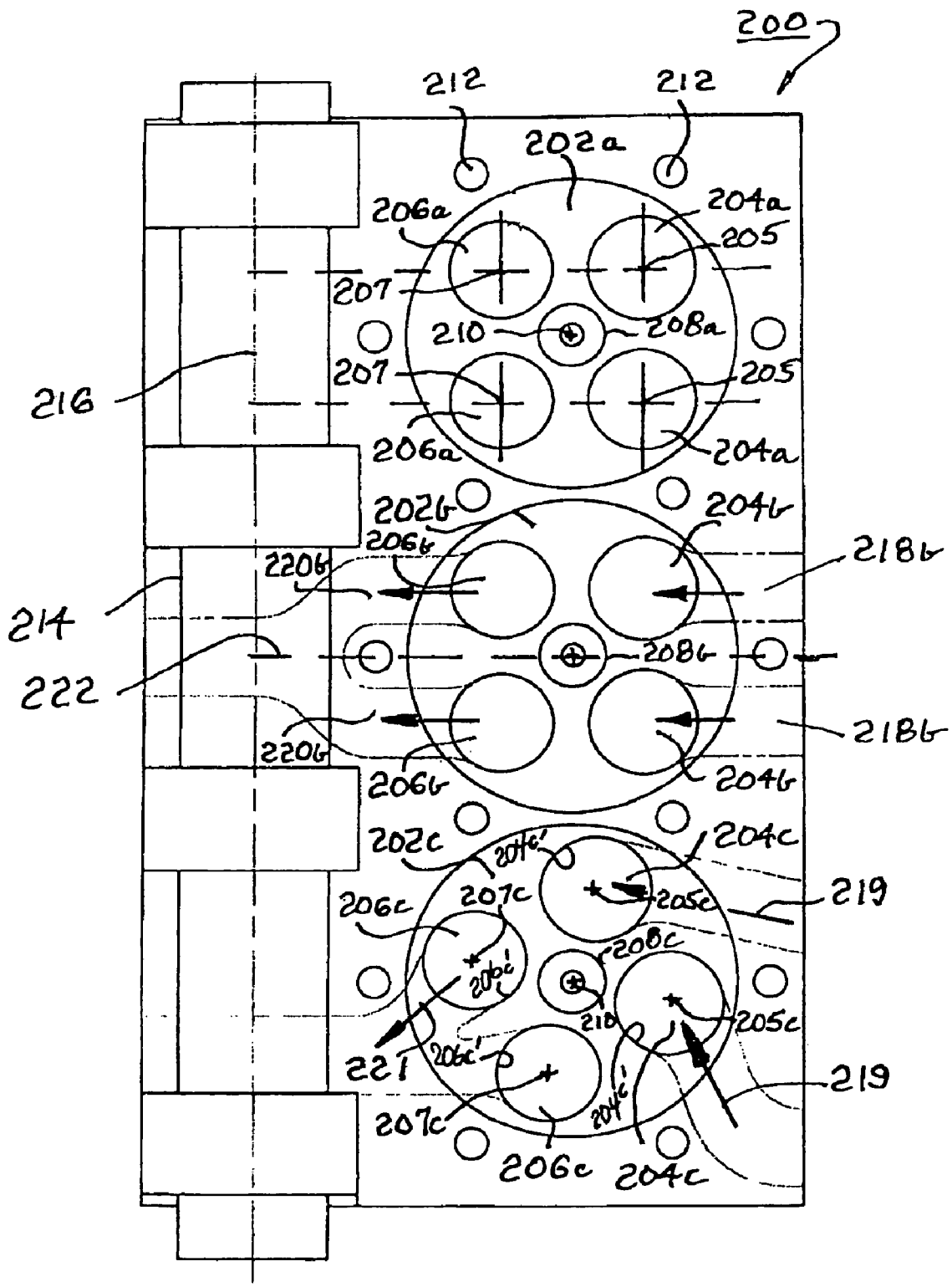
FIG. 9 is a schematic plan view of an engine head showing exemplary arrangements of valves in a four-valve cylinder.

Referring now to FIG. 9, another important advantage of an electro-hydraulic valve train system in accordance with the invention is that the axes of paired intake and exhaust valves need not be placed in a plane containing the motion of a rocker arm as in the prior art. This permits the valving to be "skewed" to produce tangential entry of intake gases and tangential exit of exhaust gases, resulting in swirl of gases within the cylinder which is known to be highly beneficial for good mixing.

FIG. 9 is a schematic plan view of an idealized cylinder head 200 having three cylinder firing chambers 202a, 202b, 202c, four valves per cylinder (two intake 204 having axes 205, and two exhaust 206 having axes 207), a fuel injector 208 coaxial with the cylinder axis 210, six head bolts 212 per cylinder, and a single overhead camshaft 214 having an axis 216. (It should be understood that the firing chambers are non-identical for purposes of illustration, and the head does not represent an actual engine head configuration.)

Chamber 202a shows a conventional prior art orientation of the valves as operated by a mechanical valve train (not shown). Intake valves 204a are equidistant from camshaft axis 216, as are exhaust valves 206a and their respective seats. The valves typically are operated in tandem by a mechanical bridge arrangement similar to bridge 89 in FIG. 2, the intake valve train extending over the fuel injector in a very compacted arrangement. The valve axes 205,207 are parallel to cylinder axis 210.

Referring to chamber 202b, the mechanical relationships should be understood to be identical with those of chamber 202a. The purpose of chamber 202b is to show the effect of prior art intake and exhaust porting accompanying the valve configuration. Separate and identical intake ports 218b service intake valves 204b, and separate exhaust ports 220b service exhaust valves 206b. Because the cylinder, valves, and porting are symmetrically disposed about a plane of symmetry 222 orthogonal, which is also orthogonal to camshaft axis 216, gases entering and exiting the cylinder have zero net vector tangential to the cylinder wall; that is, in the prior art valve configuration, there is no swirl produced.

Referring to chamber 202c, the valve train for which should be understood to include an electro-hydraulic apparatus in accordance with the invention, because the valves are not bound by mechanical actuation linkage restrictions, intake valves 204c and exhaust valves 206c and their respective seats 204c' and 206c' need not be equidistant from camshaft axis 216 as in the prior art, i.e., the valves are "skewed" with respect to prior art symmetry plane 222. Further, the valve axes 205c,207c need not be parallel to cylinder axis 210 but preferably are non-parallel thereto and preferably are disposed radially thereof, as described hereinabove with respect to FIGS. 7 and 8. Preferably, firing chamber 202c is domed, similar to chamber 124 (FIG. 7).

A very important benefit of skewed valves is that intake ports 218c may be readily configured such that the cylinder-tangential vectors of gases entering through the two intake valves 204c reinforce each other, producing a counterclockwise (in this example) swirl 219 of gases in the cylinder, rather than cancel each other as in prior art intake valves 204b. Further, by selectively deactivating one of exhaust valves 206c, swirl 221 may be produced in the exhaust gases as well, which can be very helpful in mixing exhaust gases with intake gases in some engine operation modes.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A module for providing selective lost motion in a hydraulically-actuated valve train of an internal combustion engine having a lost-motion bore in hydraulic communication with a main bore and pressure chamber of said valve train, the module comprising:

a) a module body;

b) an accumulation piston extendable from said module body and slidably disposable in said lost motion bore to provide a lost-motion volume for hydraulic fluid in said lost-motion bore on a first side of said accumulation piston, and defining a well in said module body adjacent a second side of said accumulation piston;
c) a control chamber formed in said module body and fillable with a hydraulic fluid;
d) a servo-valve disposed in a passage in said body hydraulically connecting said control chamber to a sump;
e) a control piston extending from said second side of said accumulation piston into said control chamber,
wherein closing of said passage by said servo-valve causes said control chamber to be made hydraulically rigid by preventing flow of hydraulic fluid from said control chamber to said sump, thereby preventing said control piston and said accumulation piston from moving in said lost-motion bore, and
wherein opening of said passage by said servo-valve causes said control chamber to be made hydraulically fluid by allowing flow of hydraulic fluid from said control chamber to said sump, thereby permitting said control piston and said accumulation piston to move in said lost-motion bore.

2. A module in accordance with claim 1 further comprising a solenoid actuator for opening and closing said servo-valve.

3. A module in accordance with claim 1 wherein said control piston is hollow and in communication with said lost-motion bore via a passage through said accumulation piston and a check valve disposed in said passage.

4. A module in accordance with claim 1 wherein the volume change in said control chamber during operation of said module in lost-motion mode is less than the volume change in said lost-motion volume.

5. An electro-hydraulic lost-motion system for controlling the action of a valve in an internal combustion engine having a camshaft, comprising:
a) an assembly body having a main bore;
b) a master piston slidably disposed in said main bore;
c) means disposed between said camshaft and said master piston for translating camshaft rotation into master piston reciprocation in said main bore;
d) a pressure chamber formed in said main bore adjacent said master piston;
e) a slave piston disposed in a slave bore adjacent said engine valve;
f) a hydraulic passage between said pressure chamber and said slave piston; and
g) a lost-motion module disposed in said engine for selectively varying hydraulic pressure in said hydraulic passage, said module including,
a module body,
an accumulation piston extending from said module body and slidably disposed in a lost-motion bore in said module body to provide a lost-motion volume for hydraulic fluid in said lost-motion bore on a first side of said accumulation piston, and defining a well in said module body adjacent a second side of said accumulation piston,
a control chamber formed in said module body and fillable with a hydraulic fluid,
a servo-valve disposed in a passage in said module body hydraulically connecting said control chamber to a sump,
a control piston extending from said second side of said accumulation piston into said control chamber,
wherein closing of said module body passage by said servo-valve causes said control chamber to be made hydraulically rigid by preventing flow of hydraulic fluid from said control chamber to said sump, thereby preventing said control piston and said accumulation piston from moving in said lost-motion bore, and
wherein opening of said module body passage by said servo-valve causes said control chamber to be made hydraulically fluid by allowing flow of hydraulic fluid from said control chamber to said sump, thereby permitting said control piston and said accumulation piston to move in said lost-motion bore.

6. A lost-motion system in accordance with claim 5 wherein said lost-motion bore is an extension of said main bore.

7. A lost-motion system in accordance with claim 5 wherein said lost-motion bore is remote from said main bore.

8. A lost-motion system in accordance with claim 7 wherein said lost-motion bore is adjacent said slave bore.

9. A lost-motion system in accordance with claim 5 wherein said engine is selected from the group consisting of spark ignited and compression ignited.

10. A lost-motion system in accordance with claim 5 wherein said hydraulic fluid is diesel fuel.

11. A lost-motion system in accordance with claim 5 wherein said means for translating camshaft rotation include at least one roller finger follower.

12. A lost-motion system in accordance with claim 11 wherein said roller finger follower is pivotably attached at a first end to said engine and includes a roller at a second end for following said cam.

13. A lost-motion system in accordance with claim 5 wherein said engine is a diesel engine having a pressurized fuel rail and wherein said system is provided with diesel fuel as a hydraulic fluid from said fuel rail.

14. A lost-motion system in accordance with claim 5 wherein said camshaft is driven at a first end by means attached to a crankshaft of said engine adjacent a main flywheel thereof.

15. A lost-motion system in accordance with claim 14 further comprising a fuel pump wherein said fuel pump is driven by a second end of said camshaft opposite said first end.

16. A lost-motion system in accordance with claim 14 wherein a camshaft phaser is interposed between said camshaft and said crankshaft.

17. A lost-motion system in accordance with claim 5 wherein said engine is a V-block engine and said camshaft is disposed within said V-block.

18. A lost-motion system in accordance with claim 5 wherein said camshaft is the only camshaft for said engine.

19. A lost-motion system in accordance with claim 5 wherein said system controls at least one intake valve and at least one exhaust valve for an individual cylinder and wherein a single lobe of said camshaft actuates the at least one intake valve and the at least one exhaust valve for said individual engine cylinder.

20. A lost-motion system in accordance with claim 5 wherein said servo-valve is actuated a plurality of times for each combustion cycle of said engine.

21. A lost-motion system in accordance with claim 20 wherein said plurality of actuations occurs during closing of said engine valve.

22. A lost-motion system in accordance with claim 5 further comprising a rocker arm disposed between said slave piston and said engine valve.

* * * * *